(12) United States Patent
Clifton et al.

(10) Patent No.: US 8,014,665 B2
(45) Date of Patent: Sep. 6, 2011

(54) METHOD, APPARATUS AND SOFTWARE FOR PROCESSING PHOTOGRAPHIC IMAGE DATA USING A PHOTOGRAPHIC RECORDING MEDIUM

(75) Inventors: John Mark Clifton, Hetford (GB); Thomas van der Veen, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 12/116,458

(22) Filed: May 7, 2008

(65) Prior Publication Data

US 2008/0292300 A1    Nov. 27, 2008

(30) Foreign Application Priority Data

May 22, 2007   (GB) .................... 07108633.4

(51) Int. Cl.
*G03B 17/24* (2006.01)

(52) U.S. Cl. ...................................................... 396/311
(58) Field of Classification Search ........... 396/310–321
See application file for complete search history.

(56) References Cited

U.S. PATENT DOCUMENTS

| 6,317,567 | B1 * | 11/2001 | Ichikawa et al. ........... 396/315 |
| 6,429,924 | B1 * | 8/2002 | Milch ........................ 355/40 |
| 7,076,161 | B2 * | 7/2006 | Koike ......................... 396/6 |

OTHER PUBLICATIONS

Wikipedia, "Exchangable Image File Format". Jul. 17, 2005. http://en.wikipedia.org/w/index.php?title=Exchangeable_image_file_format&diff=19009413&oldid=19009370.*

* cited by examiner

*Primary Examiner* — Clayton E Laballe
*Assistant Examiner* — Dennis Hancock

(57) ABSTRACT

The present invention relates to a method, apparatus or software for processing photographic image data using a photographic recording medium arranged for capturing successive optical images in a series of discrete frames.

15 Claims, 5 Drawing Sheets

METHOD, APPARATUS AND SOFTWARE FOR PROCESSING PHOTOGRAPHIC IMAGE DATA USING A PHOTOGRAPHIC RECORDING MEDIUM

FIELD OF INVENTION

The present invention relates to a method, apparatus or software for processing photographic image data using a photographic recording medium arranged for capturing successive optical images in a series of discrete frames.

BACKGROUND OF THE INVENTION

When capturing an optical image using a device such as a camera, in addition to the image data itself, it is common to record associated data, relating to the image or its capture. Such information, known as, metadata, may comprise exposure data, camera position data, camera or film data. In digital camera equipment, such metadata may be recorded and associated with an accompanying image file using the Exchangeable Image File Format (Exif). With photographic film camera equipment, some film formats such as the Advanced Photo System (APS) format enable some metadata to be recorded associated with an image frame. However, one problem with recording metadata with photographic film is that either the amount of metadata that can be recorded is limited or the image frame is compromised.

SUMMARY OF THE INVENTION

An embodiment of the invention provides a method for processing photographic image data using a photographic recording medium arranged for capturing successive optical images in a series of discrete frames. The method includes, capturing an optical image in a first frame on a photographic recording medium, determining a set of metadata associated with the optical image, converting the set of metadata into data representing a two dimensional optical barcode, and recording an image of the two dimensional optical barcode, in association with the first frame, in a second frame on the photographic recording medium.

The method may further comprise scanning the photographic recording medium to identify the first frame and recording the optical image in an image data file, scanning the photographic recording medium to identify the second frame associated with the first frame and decoding the two dimensional optical barcode in the second frame to retrieve the set of metadata and recording the metadata in a metadata file associated with the image data file.

The second frame may be interposed on the recording medium between the first frame and a third frame for capturing a further optical image. The second frame may be of a predetermined area. The second frame may have an area dependent on the size of the metadata. The frames for capturing optical images may be interleaved with frames for recording metadata. The frames for capturing optical images may be recorded in a first block and frames for recording metadata may be recorded in a second block. The photographic recording medium may be 135 format photographic film. The metadata may comprise equivalent data to Exif metadata. The metadata may be recorded as Exif metadata associated with the image data file. The metadata may be recorded as Exif metadata within the image data file. Further data may be appended to the metadata during the processing.

DETAILED DESCRIPTION OF PREFERRED EMBODIMENTS OF THE INVENTION

Figure 1:
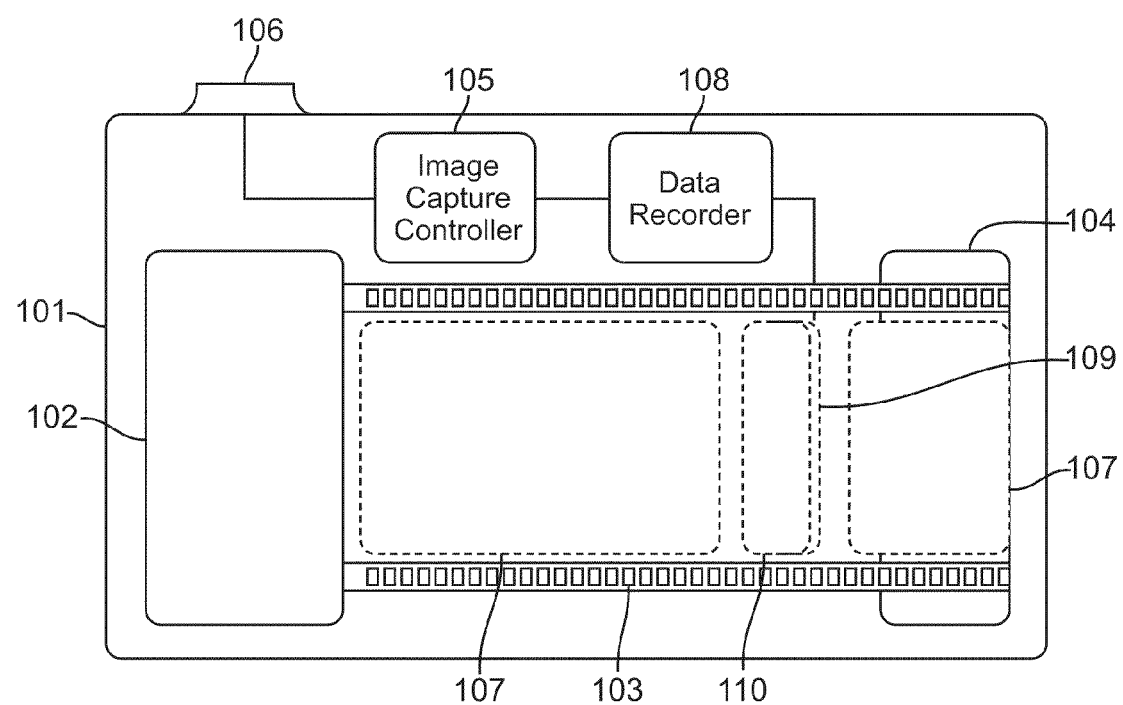
FIG. 1 is a schematic illustration of an image capture device in the form of a camera.

With reference to FIG. 1, an image capture device in the form of a camera 101 comprises a loaded photographic film cartridge 102 carrying a roll of photographic film 103 in the form of 135 format film. The film is wound onto a film carriage 104 and is in operational position arranged for capturing optical images exposed via a lens and shutter system (not shown). The lens and shutter system are controlled via an image capture controller 105, which is triggered via user operation of a button 106. The camera 101 is arranged to capture optical images on the film 103 in a conventionally sized image frame 107 for the film format.

The camera further comprises a data recorder 108 arranged to record metadata associated with a given optical image recorded in the frame 107. The metadata, in the present embodiment, conforms to the Exchangeable Image File Format (Exif) data format and comprises image exposure data, time and date data and camera identification data. The data recorder 108 is connected to a Light Emitting Diode (LED) array 109 arranged to expose a metadata frame 110 on the film 103. The metadata frame 110 is exposed with an image of a two dimensional (2D) barcode carrying an encoded version of the metadata created by the data recorder 108. The data recorder 108 is further arranged to control the LED array 109 so as to expose the film 103 to the 2D barcode as the film is moved past the LED array 109 by the wind-on action of the film carriage 104. This enables the one-dimensional LED array 109 to expose a two dimensional image.

Figure 2:
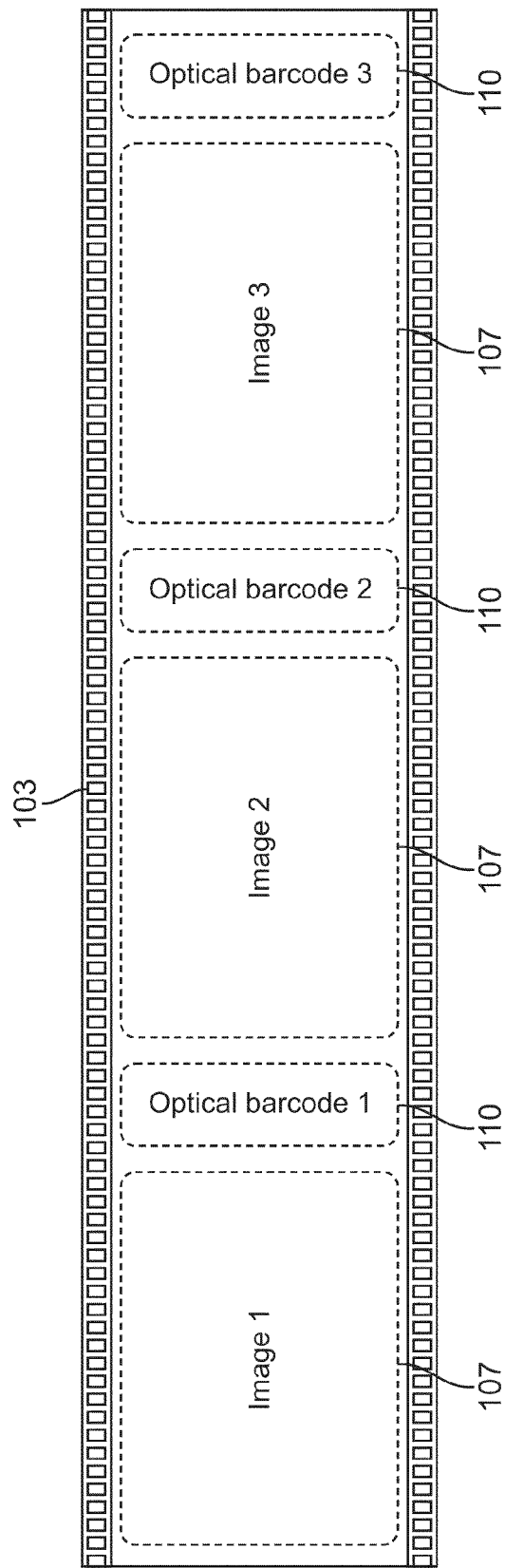
FIG. 2 is a schematic illustration of a photographic film exposed by the camera of FIG. 1.

Once exposed to a number of images, the film 103 comprises a sequence of image frames 107 interleaved with metadata frames 110 as shown in FIG. 2. In the present embodiment the metadata frames are contained within the conventional inter frame gap. In other words, the metadata frames are inserted between image frames within the conventionally unexposed portion of the film 103 between image frames.

Figure 3:
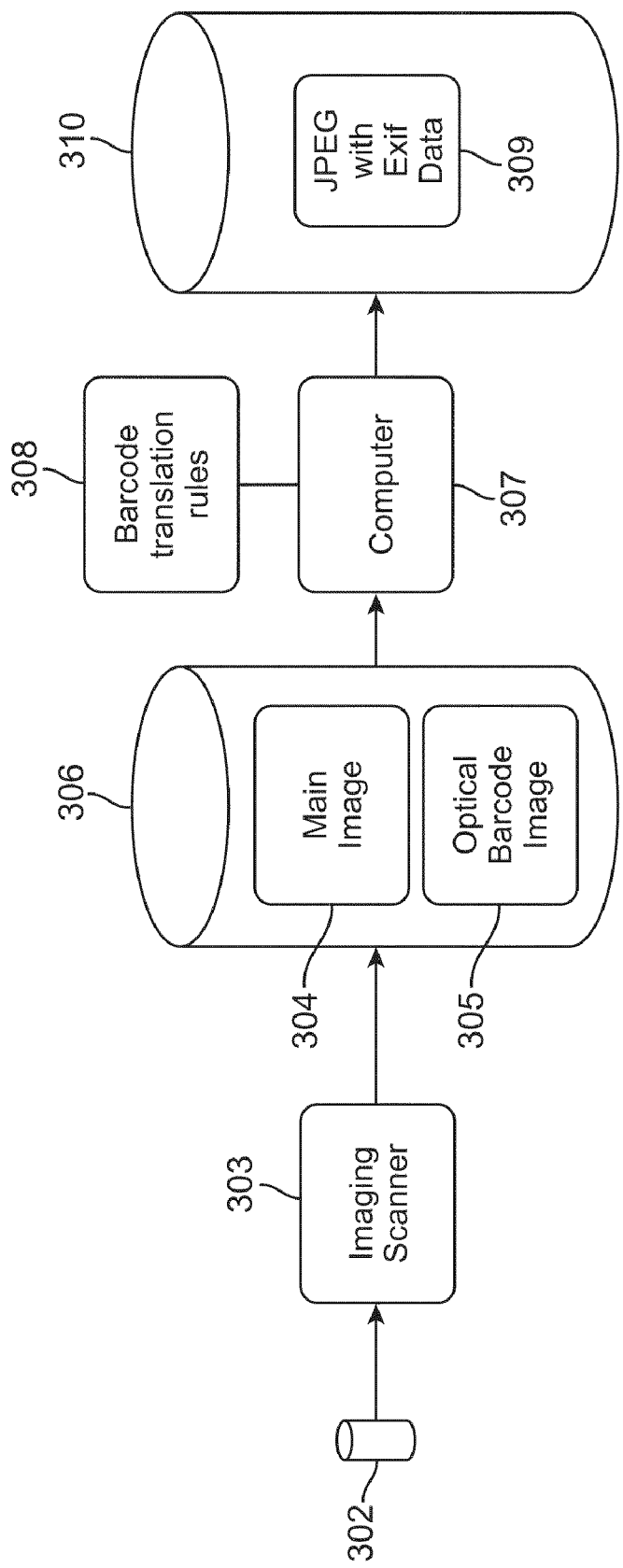
FIG. 3 is a schematic illustration of a scanning process for processing the photographic film of FIG. 2.

With reference to FIG. 3, a scanning system 301 for scanning rolls 302 of photographic film 103 exposed as shown in FIG. 2 comprises an image scanner 303 in the form of a 2D imaging scanner. The image scanner 303 is arranged to scan each image frame 107 and its associated metadata frame 110 and to store each pair of images in respective electronic files 304, 305 on a storage device 306 in the form of a hard disk. The image file 304 scanned from the image frame 107 contains data representing the optical image from the corresponding image frame 107. The metadata file 305 scanned from the metadata frame 110 contains data representing the optical image of the 2D bar code from the corresponding metadata frame 110. In the present embodiment, the files 304, 305 are in the Joint Photographic Experts Group (JPEG) format.

The scanning system 301 further comprises a computer 307 running an application program arranged for accessing the files 304, 305 on the storage device 306. The application program decodes the 2D barcode represented by the metadata file 305 using a set of barcode translation rules 308 to extract the encoded Exif data. The computer is then arranged, in the present embodiment, to embed the Exif data within the image file 304 to provide a single Exif/Jpeg file 309 representing both the image from the image frame 107 and the metadata decoded from the metadata frame 110.

Figure 4:
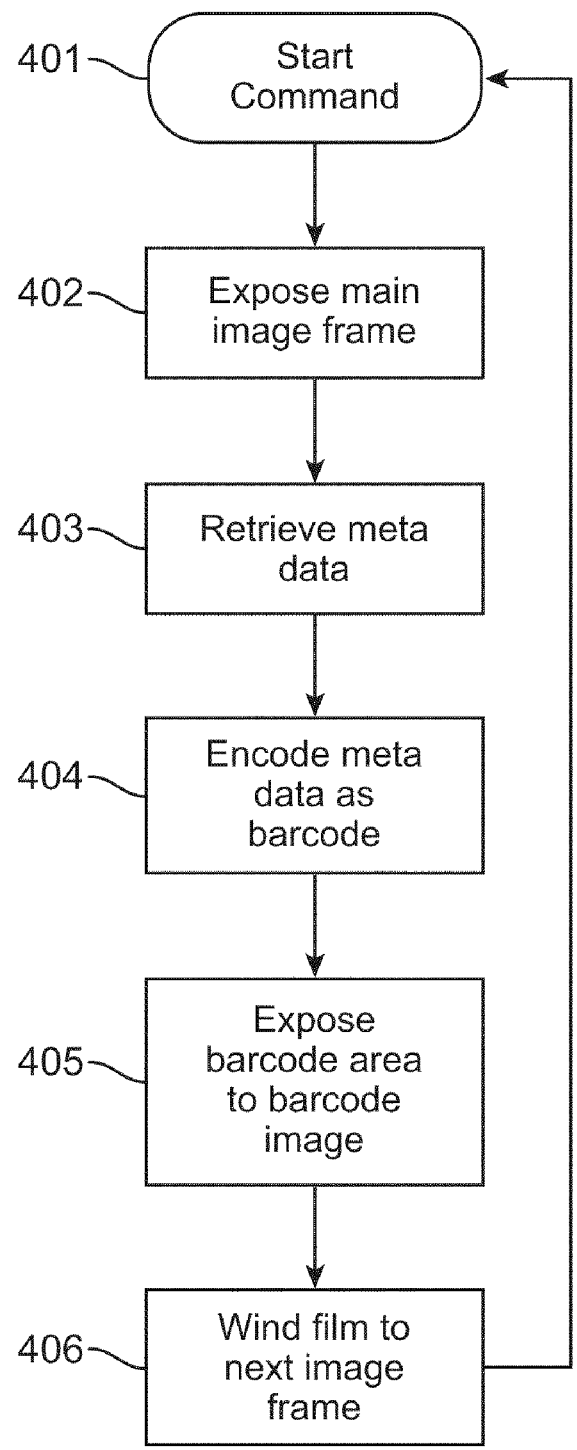
FIG. 4 is a flowchart illustrating processing performed by the camera of FIG. 1.

The processing performed by the camera 101 in order to expose a film 103 in the manner described above will now be described in further detail with reference to FIG. 4. At step 401, a start command is received from the camera user via the button 106 indicating that an image should be captured. Processing then moves to step 402 where the main image is exposed in the image frame 107 in a conventional manner. Processing then moves to step 403 where the metadata associated with the captured image is retrieved by the data recorder 108 from the image capture controller 105. Processing then moves to step 404 where the metadata is encoded in a 2D barcode and processing moves to step 405. At step 405, the film carriage 104 and the LED array 109 are activated so as to expose the film metadata frame 110 with 2D barcode. Processing then moves to step 406 where the film carriage is further activated so as to wind the film 103 to bring a successive image frame 107 into position for exposure. Processing then moves to step 401 and proceeds as described above.

Figure 5:
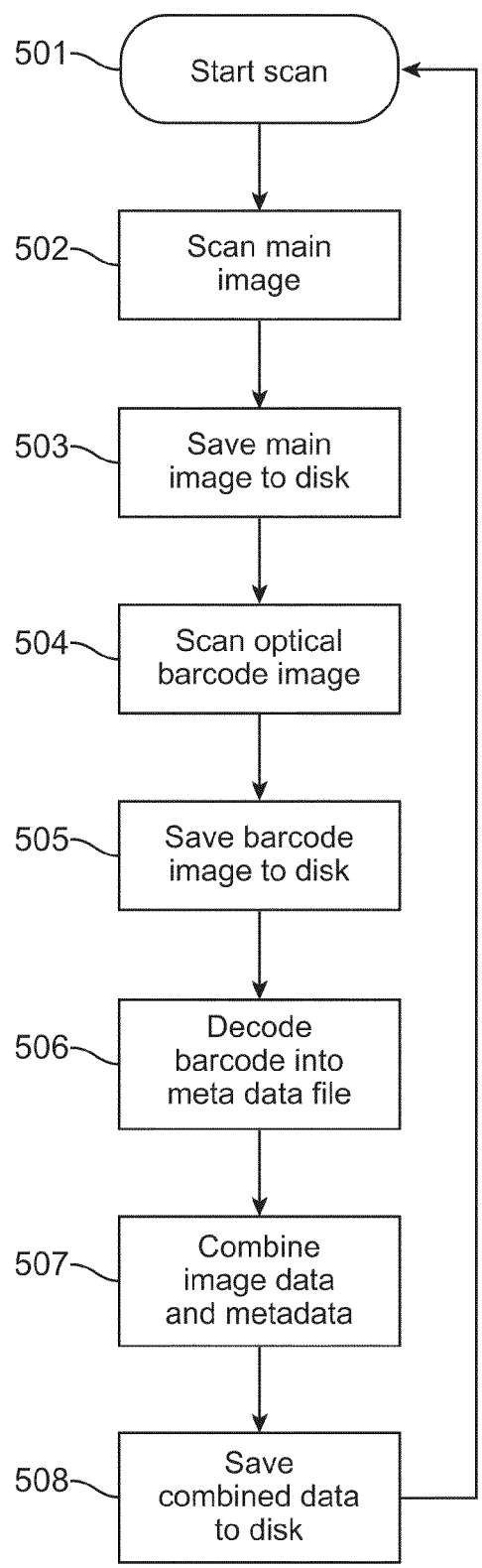
FIG. 5 is a flowchart illustrating processing performed in the scanning process of FIG. 3.

The processing performed by the image scanning system 301 when scanning a roll 302 of photographic film 103 exposed as shown in FIG. 2 will now be described in further detail with reference to FIG. 5. At step 501, a start command is received from a user having loaded a film cartridge 302 in the imaging scanner 303 and processing moves to step 502. At step 502, the image frame 107 is scanned and at step 503 the image is recorded in a JPEG image file 304 on the disk 306. Processing then moves to step 504 where the metadata frame 110 is scanned and the optical barcode saved to disk as a 2D barcode image file 305 as described above. Processing then moves to step 506 where the 2D barcode image file 305 is decoded into an Exif metadata file using the decoding rules 308. Processing then moves to step 507 where the Exif metadata is embedded in the Jpeg image file 305 to produce an Exif/Jpeg image file 309 that is then stored on the disk 310.

The embodiments of the invention as described herein enable a camera using conventional photographic film to expose standard image frames and, in addition, to record associated metadata in the form of 2D optical barcodes. This arrangement then enables Exif/Jpeg image files to be produced that are compatible with those commonly produced by digital cameras.

In another embodiment, the size of the metadata frame is variable depending on the amount of metadata represented by the 2D barcode. In a further embodiment, the metadata frame is fixed to a dimension within the standard inter frame gap for a given camera or film format. In another embodiment, the image frames are recorded in a first block and the metadata frames are recorded in a second block.

As will be understood by those skilled in the art, the embodiments described herein are not restricted to the 135 format film but may be applied to any other suitable film format. Furthermore, the embodiments are not restricted to the use of the JPEG and or Exif file formats. For example, the Tagged Image File Format/Electronic Photography format (TIFF/EP), the Digital Negative format (DNG), Design Rule for Camera File System format (DCF), custom formats or other suitable formats may be used.

In a further embodiment, the metadata comprises data in addition to or other than Exif metadata. In another embodiment, the metadata is recorded as Exif metadata associated with the image data file. In a further embodiment, further data is appended to the metadata during the processing of the film or data files.

In the embodiments described above, the image capture device, in the form of a camera, comprises an image capture controller and a data recorder. In other embodiments, the camera may comprise a central processor or processors arranged with suitable software for providing the functions of the image capture controller and a data recorder as described above.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for processing photographic image data using a photographic recording medium, the method comprising:
    capturing successive optical images in a series of discrete image frames on the photographic recording medium;
    recording a set of metadata associated with each image; and
    exposing a set of metadata associated with an optical image in a metadata frame, the metadata frame contained within an inter frame gap located between adjacent image frames,
    wherein exposing a set of metadata comprises exposing metadata associated with each captured optical image in a metadata frame between the image frame containing the optical image associated with the set of metadata and a subsequent image frame, such that the metadata is exposed outside of a region of the image frame and metadata frames are interleaved between image frames on the photographic recording medium.

2. The method of claim 1 further comprising:
    scanning the photographic recording medium to identify a first image frame and recording an optical image in the first image frame in an image data file;
    scanning the photographic recording medium to identify a first metadata frame; and
    recording the set of metadata in the first metadata frame in a metadata file associated with the image data file.

3. The method of claim 2 wherein the metadata is recorded as Exif metadata associated with the image data file.

4. The method of claim 3 wherein the metadata is recorded as Exif metadata within the image data file.

5. The method of claim 3 wherein data is appended to the metadata when the metadata is recorded as Exif metadata associated with the image data file.

6. The method of claim 1 further comprising:
capturing a next optical image in a next image frame on the photographic recording medium;
recording a set of metadata associated with the next optical image;
converting the set of metadata into data representing a two dimensional optical barcode; and
exposing an image of the two dimensional optical barcode in a next metadata frame on the photographic recording medium as the photographic recording medium is moved past a light array, the next metadata frame contained within a next inter frame gap located between the next image frame and a subsequent image frame on the photographic recording medium, wherein each set of metadata associated with each captured optical image is exposed as a two dimensional image in a metadata frame contained within the inter frame gap located between the image frame containing the optical image associated with the set of metadata and a subsequent image frame on the photographic recording medium, such that the metadata is exposed outside of the region of the image frame.

7. The method of claim 6 wherein the metadata frame has an area dependent on the size of the metadata.

8. The method of claim 1 wherein the photographic recording medium is 135 format photographic film.

9. The method of claim 8 wherein the metadata comprises equivalent data to Exif metadata.

10. A method for processing photographic image data recorded on a photographic recording medium, the method comprising:
scanning the photographic recording medium to identify a first image frame comprising a first optical image;
recording the first optical image in a first image data file;
scanning the photographic recording medium to identify a first metadata frame, the first metadata frame contained within an inter frame gap on the photographic recording medium located between the first image frame and a second image frame such that the first metadata frame is outside of a region of the first image frame and second image frame and interleaved between the first and second image frames, the metadata frame comprising a set of metadata associated with the first optical image;
retrieving the set of metadata; and
recording the set of metadata in a first metadata file associated with the first image data file.

11. An image capture device comprising:
a photographic recording medium wound about a carriage, the photographic recording medium comprising:
a series of discrete image frames for capturing successive optical images, adjacent image frames separated by inter frame gap; and
a series of metadata frames, each metadata frame contained within the inter frame gap between adjacent optical image frames, such that metadata frames are located outside of a region of the image frames and interleaved between optical images captured on the photographic recording medium, each metadata frame for storing a set of metadata associated with the optical image preceding the metadata frame; and
a recorder for recording the set of metadata associated with each optical image captured on the recording medium and for exposing the series of metadata frames on the recording medium, the recorder comprising:
the recorder recording the set of metadata associated with each optical image captured on the photographic recording medium;
a converter for converting each set of metadata into data representing an optical barcode; and
a light array for exposing each metadata frame with a set of metadata associated with the optical image preceding the metadata frame on the photographic recording medium, the light array exposing each metadata frame as the photographic recording medium is wound about the carriage so that each set of metadata is exposed as a two dimensional optical barcode in each metadata frame, such that each metadata frame contains data representative of the set of metadata associated with the optical image preceding the metadata frame.

12. The device of claim 11 further comprising:
the recorder configured to scan the photographic recording medium to identify a first frame and record the optical image in an image data file;
the recorder configured to scan the photographic recording medium to identify the metadata frame associated with the first frame; and
the recorder configured to decode the two dimensional optical barcode in the metadata frame to retrieve the set of metadata and to record the metadata in a metadata file associated with the image data file.

13. The device of claim 12 further comprising:
the recorder configured to scan the photographic recording medium to identify a next frame in the series of frames and record the optical image in an image data file;
the recorder configured to scan the photographic recording medium to identify the metadata frame associated with the next frame in the series of frames; and
the recorder configured to decode the optical barcode in the metadata frame to retrieve the set of metadata and to record the metadata in a metadata file associated with the image data file.

14. The device of claim 11 wherein the metadata frame has an area dependent on the size of said metadata.

15. An apparatus for processing photographic image data recorded on a photographic recording medium, the apparatus comprising:
a scanner for scanning the photographic recording medium to identify a first image frame comprising an optical image and recording the image in an image data file;
the scanner scanning the photographic recording medium to identify a metadata frame, the metadata frame contained within an inter frame gap on the photographic recording medium located between the first image frame and a second image frame, such that metadata frames are located outside of a region of an image frame and interleaved between image frames, the metadata frame comprising a set of metadata in the form of an optical barcode; and
a recorder for decoding the barcode to retrieve the set of metadata and to record the metadata in a metadata file associated with the image data file.

* * * * *